United States Patent
Roberts et al.

(10) Patent No.: US 8,448,689 B2
(45) Date of Patent: May 28, 2013

(54) ROLL-UP DOOR ASSEMBLY, AND BLOW MOLDED PANEL THEREFOR

(75) Inventors: Gary Roberts, Fruitport, MI (US); Tom Gerst, Twin Lake, MI (US)

(73) Assignee: Fleet Engineers, Inc., Muskegon, MI (US)

( * ) Notice: Subject to any disclaimer, the term of this patent is extended or adjusted under 35 U.S.C. 154(b) by 214 days.

(21) Appl. No.: 12/422,647

(22) Filed: Apr. 13, 2009

(65) Prior Publication Data

US 2009/0255184 A1    Oct. 15, 2009

Related U.S. Application Data

(60) Provisional application No. 61/044,711, filed on Apr. 14, 2008.

(51) Int. Cl.
E05D 15/22 (2006.01)
(52) U.S. Cl.
USPC ......... 160/236; 160/201; 296/186.3; 296/155
(58) Field of Classification Search
USPC ................... 160/201, 236; 296/186.3, 155
See application file for complete search history.

(56) References Cited

U.S. PATENT DOCUMENTS

| | | | |
|---|---|---|---|
| 1,853,141 A * | 4/1932 | Overholtz | 40/624 |
| 2,993,572 A * | 7/1961 | Rich | 160/229.1 |
| 3,334,681 A * | 8/1967 | Crosswell | 160/40 |
| 3,891,021 A * | 6/1975 | Geoffrey | 160/235 |
| 3,980,123 A * | 9/1976 | Vago | 160/201 |
| 4,676,293 A * | 6/1987 | Hanssen | 160/201 |
| 4,762,379 A * | 8/1988 | Beam et al. | 312/348.6 |
| 4,991,639 A * | 2/1991 | Clay et al. | 160/201 |
| 5,016,700 A * | 5/1991 | Wegner et al. | 160/232 |
| 5,178,356 A * | 1/1993 | Schouwey | 248/519 |
| 5,272,839 A * | 12/1993 | Karhu | 49/409 |
| 5,445,208 A * | 8/1995 | Shaner et al. | 160/232 |
| 5,555,923 A * | 9/1996 | Leist et al. | 160/229.1 |
| 5,941,021 A * | 8/1999 | Valls et al. | 49/92.1 |
| 6,062,293 A * | 5/2000 | Berger, Jr. | 160/229.1 |
| 6,083,601 A * | 7/2000 | Prince et al. | 428/71 |
| 6,443,209 B1 * | 9/2002 | Hurst | 160/230 |
| 6,672,362 B1 | 1/2004 | Mullet et al. | |

(Continued)

FOREIGN PATENT DOCUMENTS

| | | |
|---|---|---|
| CA | 2210018 A | 6/1998 |
| DE | 7707029 U | 3/1977 |

(Continued)

*Primary Examiner* — Katherine Mitchell
*Assistant Examiner* — Marcus Menezes
(74) *Attorney, Agent, or Firm* — McGarry Bair PC

(57) ABSTRACT

A roll-up door has a plurality of panels and a plurality of roller assemblies mounted to ends of the panels for mounting the panels in channels. At least some of the panels are formed of blow-molded thermoplastic material and have a relatively flat outside face and an inside face including ribs that extend longitudinally and transversely on the panel. A reinforced panel of thermoplastic material is made by blow molding a panel with a thermoplastic material to form a relatively flat outside face and a ribbed inside face, and with elongated channels along upper and lower walls thereof. The panel is trimmed while it is still warm to open the channels at one end. While the panel is still warm, reinforcing members are inserted into the elongated channels. The panels are cooled to shrink the channels onto the reinforcing members.

19 Claims, 5 Drawing Sheets

U.S. PATENT DOCUMENTS

| | | | |
|---|---|---|---|
| 6,742,564 B2* | 6/2004 | Martin | 160/201 |
| 6,826,887 B2* | 12/2004 | Skov | 52/793.1 |
| 6,955,206 B2 | 10/2005 | Mullet et al. | |
| 6,969,109 B2* | 11/2005 | Brim et al. | 296/186.4 |
| 7,111,660 B2* | 9/2006 | Hartmann | 160/201 |
| 7,210,277 B2 | 5/2007 | Steed et al. | |
| 7,669,384 B2* | 3/2010 | Kaida et al. | 52/790.1 |
| 2002/0108323 A1* | 8/2002 | Gruber | 52/177 |
| 2003/0034671 A1* | 2/2003 | Streiff et al. | 296/203.01 |
| 2003/0213093 A1* | 11/2003 | Perks | 16/91 |
| 2005/0028454 A1* | 2/2005 | Steed et al. | 52/36.1 |
| 2005/0217807 A1* | 10/2005 | Brim et al. | 160/201 |
| 2006/0237992 A1* | 10/2006 | Lemmons | 296/186.1 |
| 2006/0272784 A1* | 12/2006 | Huneycutt | 160/201 |
| 2007/0033899 A1* | 2/2007 | Kaida et al. | 52/783.1 |
| 2007/0209295 A1 | 9/2007 | Mower et al. | |
| 2008/0229696 A1* | 9/2008 | Benson et al. | 52/588.1 |
| 2011/0186243 A1* | 8/2011 | Tucci | 160/214 |

FOREIGN PATENT DOCUMENTS

| | | |
|---|---|---|
| DE | 29802245 U | 4/1999 |
| EP | 1703065 A2 | 9/2006 |
| EP | 1870557 A1 | 12/2007 |
| GB | 2450613 A | 12/2008 |

* cited by examiner

ROLL-UP DOOR ASSEMBLY, AND BLOW MOLDED PANEL THEREFOR

CROSS-REFERENCE TO RELATED APPLICATION

This application claims the benefit of U.S. provisional application Ser. No. 61/044,711, filed Apr. 14, 2008, which is incorporated herein in its entirety.

BACKGROUND OF THE INVENTION

1. Field of the Invention

The invention relates to roll-up door assemblies. In one of its aspects, the invention relates to blow molded panels for use in roll-up doors. In another of its aspects, the invention relates to molded plastic panels that simulate wood panels and are interchangeable with wood panels in roll-up doors. In still another of its aspects, the invention relates to a roll-up door assembly formed of blow molded plastic panels. In another of its aspects, the invention relates to a method of making a blow molded panel for use in a roll-up door assembly.

2. Description of the Related Art

Trailers for use with semi-tractors and trucks, which can be constructed separately from the semi-tractor or truck and attached thereto or constructed integrally with the semi-tractor or truck, have long used roll-up doors at an inside opening of the trailer to control access to an interior of the trailer. Roll-up doors are often preferred over vertically-hinged, outwardly-swinging doors because the roll-up doors operate within the physical space already occupied by the trailer and do not require space beyond the trailer. The roll-up door is moveable between an opened position and a closed position while being maintained entirely within the interior of the trailer, whereas the swinging doors require room along the sides of the trailer to swing from a closed position to an opened position. If the trailers are to be parked side-by-side, the swinging doors must be opened prior to parking the trailer, or the trailers must be parked far enough apart to permit the doors to swing from the closed position to the opened position, both of which are an inconvenience to the operator.

Roll-up doors typically comprise multiple panels, stacked edgewise one atop the other. The adjacent edges are connected together with hinges to form the entire door so that the panels can pivot with respect to each other. The hinges are normally located on or near the adjacent longitudinal edges of the panels. There are generally two main types of hinged structures that can be categorized by the direction in which the panels must be assembled relative to the longitudinal axis of the panels. One hinge structure requires that the panels be slid laterally (in the same direction as the longitudinal axis) to hingedly couple/uncouple the panels. Another structure requires that the panels be moved to transversely or perpendicular to the longitudinal edge to hingedly couple/uncouple the panels.

Each panel usually includes a roller assembly near each of the opposite latitudinal edges. Each roller assembly comprises an axle that rotatably supports a roller or wheel. The axle is mounted to the panel directly or, alternatively, through a hinge positioned adjacent or near the latitudinal edge. The roller is received within a track mounted within the interior of the trailer near the inside opening. As the door is raised from the closed position to the opened position, the rollers travel along the track to move the panels from a vertical position closing the inside opening of the trailer through a 90° curved section to a horizontal position overlying the interior of the trailer and exposing the inside opening of the trailer. The panels rotate relative to each other as needed about their respective hinges. The panels are constrained in their movement by the receipt of the rollers within the track. Thus, the maximum angle of rotation between any two panels can be controlled by the arc of the track.

Roll-up doors have several known problems or disadvantages. Many roll-up doors have panels that are made entirely of solid material, such as wood. The resulting door is exceptionally heavy and requires counter-balancing springs to lift and close the door. The counter-balancing springs reduce the usable volume of the trailer, which is highly undesirable given the great value placed upon usable volume for a trailer. In addition, the panels as well as the counterbalancing spring add to the trailer undesirable weight which adversely affects fuel efficiency and thus profits.

Attempts to address this problem have focused on using lighter weight materials, especially extruded plastics. The resulting extruded panels are relative light in weight, but they often require special or complex hinge systems and special structural stiffening to accommodate the mounting of the roll-up door hardware such as handles and latch assemblies.

Many roll-up doors are often time-consuming to repair. When a roll-up door is damaged, usually the repair is accomplished by merely replacing one of the multiple panels. Unfortunately, some plastic roll-up doors have a panel and hinge configuration that requires the removal of multiple or all of the panels to replace the damaged panel. Panels that have hinges that require the lateral sliding of the panels for assembly further exacerbate the replacement of a single panel in that all of the panels preceding the damaged panel must be removed from the tracks before the damaged panel can be laterally slid and uncoupled from the adjacent panels. However, current wood panel doors do not require a complete disassembly of all panels and can usually be repaired by removing the damaged panel and replacing it with a new wood panel but not with a plastic panel.

U.S. Pat. No. 3,980,123 to Vago discloses using blow molded panels sections formed of polyethylene in garage doors and the like. The panels are mounted in a rigid framework that include horizontal rails spanning the length of the door and connected vertical stile supports which span the height of the door. The horizontal rails protect the top and bottom sides of the panels and the vertical stile supports are hinged together to form the door. The hinges on the sides of the door include rollers movably mountable in tracks of an aluminum door frame. The panels include ribbed configurations on an inside wall for strengthening purposes. Dead air spaces are formed as cavities during blow-molding through the shaping of an outside wall with respect to the inside wall.

U.S. Pat. No. 6,826,887 to Skov discloses a blow-molded panel for use in a variety of applications, namely in forming storage units. The panel includes lateral slots for enhancing the structural integrity of the panel. The panel also includes a plurality of transverse ribs extending through the lateral slots for additional strengthening.

U.S. Pat. No. 4,762,379 to Beam et al. discloses blow-molding a panel comprising a plurality of depressions in a rear wall that extend to a front wall and that are fused thereto for structural rigidity. The panel is formed by blow molding in a mold cavity formed by the engagement of a first mold plate and a second mold plate. Multiple projections on the second mold plate are used to form the depressions during the molding process. Due to the restriction of the mold cavity by the projections, a plurality of blow needles project through the second mold plate such that air can be blown into each section created by the projections.

U.S. Pat. No. 7,210,277 to Steed discloses blow molding panels for use in a partition system for outdoor structures such as fences and sheds. The panels include edges with steel reinforcements. The partitions also have patterns on both sides formed by rows and columns of depressions that extend towards or engage an opposing surface. The patterns on both sides of the partitions include one or more depressions and the depressions are generally aligned so that a depression on one side of a panel is aligned with a depression on the other side of the panel. In addition, the patterns on the panels include grooves, and the depressions are formed at the intersection of the grooves. The depressions are integrally formed in the panels are said to be configured to increase the strength of the panels. Because the depressions are formed on both sides of the panel, the opposing sides of the panel may have generally the same pattern.

United States Patent Application Publication No. 2007/0209295 to Mower et al. discloses a shed comprising blow-molded panel walls. The walls can include reinforcements to provide greater strength, rigidity, impact resistance, resilience and/or ability to prevent deformation. In order to reinforce the panels, the reinforcements can have different capabilities or characteristics than the panels, such as different strength, resilience, compression and/or tension capabilities that the panels, and the reinforcements may be arranged or configured to maximize the strengths or characteristics of the thereof.

U.S. Pat. No. 6,955,206 to Mullet et al. discloses a sectional door comprising a plurality of panels formed by extrusion. The door can contain reinforcing members in form of tubes, which can be inserted into the panels after the panels are extruded and extended across the entire width of the panels. In addition, the tubes are exposed at both ends and form journals for axles of wheels. U.S. Pat. No. 6,672,362 is in the same family as '206 to Mullet et al. and discloses a similar panel construction.

SUMMARY OF THE INVENTION

According to the invention, a roll-up door assembly configured to be mounted in an opening to an interior of a truck or trailer and comprises a plurality of panels joined together at the upper and lower portions thereof with hinges. The roll-up door further comprises roller assemblies mounted to side edges of the panels for mounting the panels in channels for movement between an upper position and a lower position. At least some of the panels are formed of thermoplastic material that is blow molded into hollow panels wherein the panels have a relatively flat outside wall and an inside wall, which is characterized by ribs that extend longitudinally and transversely on the panel. At least some of the ribs that extend longitudinally are formed by contiguous, open, longitudinally-extending channels that extend toward the outside wall and at least some of the longitudinally-extending channels are fused to the outside wall of the panels. Further, the hinges are mounted to the thermoplastic blow-molded panels with fasteners that penetrate the thermoplastic blow-molded panels at the upper and lower portions thereof.

In one embodiment, the panels further have elongated hollow channels that extend along the edges of the panel and reinforcing members of a material stiffer than the thermoplastic material of the blow molded panels positioned in the elongated hollow channels.

In another embodiment, the elongated hollow channels are shrunk onto the reinforcing members to securely retain the reinforcing members in the hollow channels.

In yet another embodiment, the reinforcing members are press fit into the elongated hollow channels to securely retain the reinforcing members in the hollow channels.

In another embodiment, at least some of the hinges are positioned at the side edges of the panels, these hinges have sockets and the roller assemblies are mounted in the sockets In one embodiment, the inside wall comprises longitudinal ribs and intersecting transverse ribs. The ribs can extend to and join to the outside wall. In another embodiment, the reinforcing members are formed of a material stiffer than the thermoplastic material. Suitable material for the reinforcing members include, steel, aluminum and rigid plastic. The steel can be a Martinsite, high-strength, high-carbon steel.

In a preferred embodiment, the reinforcing members are formed on steel. Further, the reinforcing members can have a variety of profile shapes that approximate the cross sectional area of the channels. A U-shaped cross sectional profile is preferred for the reinforcing members.

Further according to the invention, panel for use in a roll-up door assembly comprising a plurality of panels directly joined together at top and bottom portions thereof with hinges and roller assemblies mounted to the panels for mounting the panels in channels for movement between an upper position and a lower position is formed of thermoplastic material that is blow-molded into a hollow form that has a relatively flat outside wall and an inside wall, which is characterized by ribs that extend longitudinally and transversely of the panel. Elongated hollow channels extend along the at least one of the top and bottom edges of the panel and a reinforcing member of a material stiffer than the thermoplastic material is frictionally retained in the or each elongated hollow channels. At least some of the ribs that extend longitudinally are formed by contiguous, open, longitudinally-extending channels that extend toward the outside wall and at least some of the longitudinally-extending channels are fused to the outside wall.

In one embodiment, the elongated hollow channels are shrunk fit onto the reinforcing members to frictionally retain the reinforcing members in the hollow channels. In another embodiment, the reinforcing members are press fit into the elongated hollow channels to frictionally retain the reinforcing members in the hollow channels.

Typically, the elongated hollow channels are formed along both the top and bottom edges of the panel, and both of the elongated hollow channels have reinforcing members frictionally retained therein.

In a preferred embodiment, the reinforcing members are formed of a relatively stiff metal, such as high strength martinsitic steel. Alternatively, the relatively stiff metal is aluminum. In yet another embodiment, the reinforcing member is formed of a rigid plastic.

DESCRIPTION OF THE PREFERRED EMBODIMENT

Figure 1:
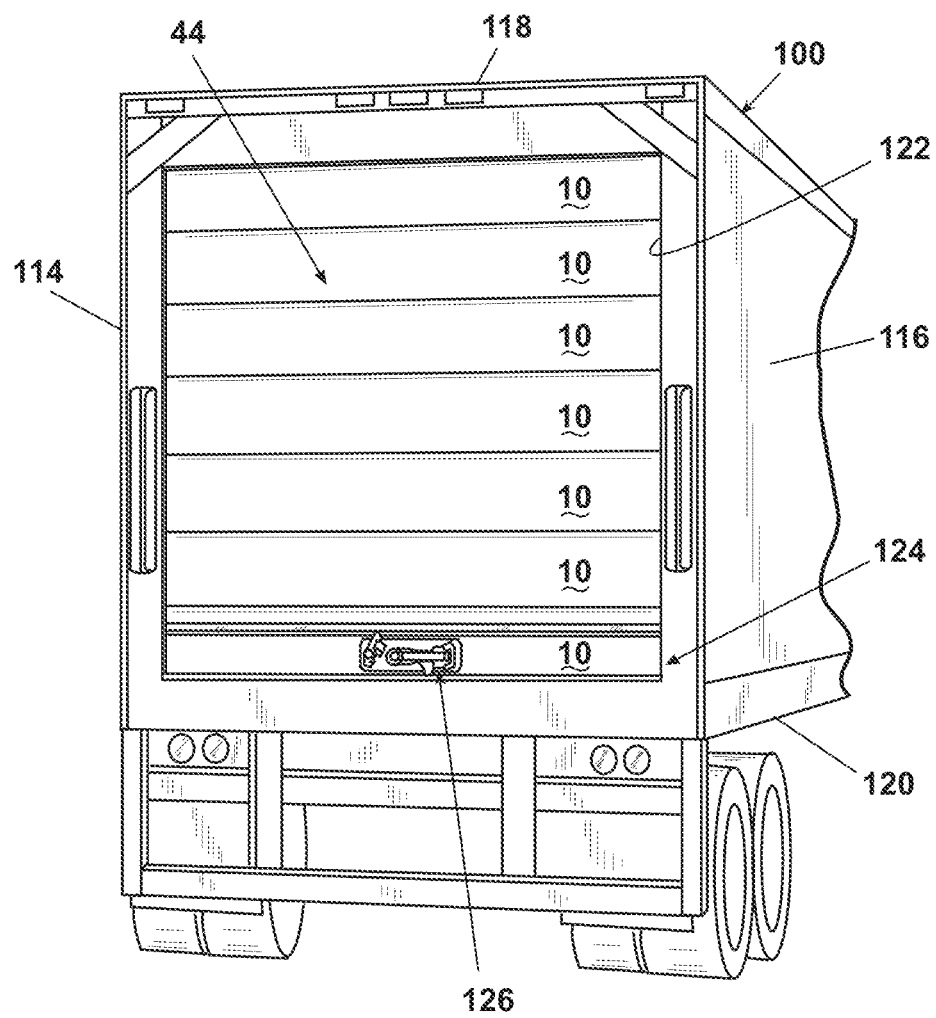
FIG. 1 is an inside perspective view of a trailer incorporating a roll-up door according to the invention, with the roll-up door comprising multiple, hingedly-coupled panels moveably mounted within a track.

Referring to FIG. 1, a conventional trailer 100 for attachment to or incorporation in a semi-tractor or truck incorporates a roll-up door 44 according to the invention. The trailer 100 is of a well-known design and comprises opposing sidewalls 114, 116 connected at respective upper ends by a top wall 118 and at respective lower ends by a bottom wall 120. The top wall 118, bottom wall 120, and sidewalls 114, 116 collectively define an inside opening 122 that is bounded by a peripheral frame 124. The roll-up door 44 is mounted to the trailer 100 such that the roll-up door 44 closes the inside opening 122 when the roll-up door is in a lowered or closed position as illustrated in FIG. 1. A latch and handle assembly 126 is provided for locking the roll-up door 44 in the closed position.

Figure 2:
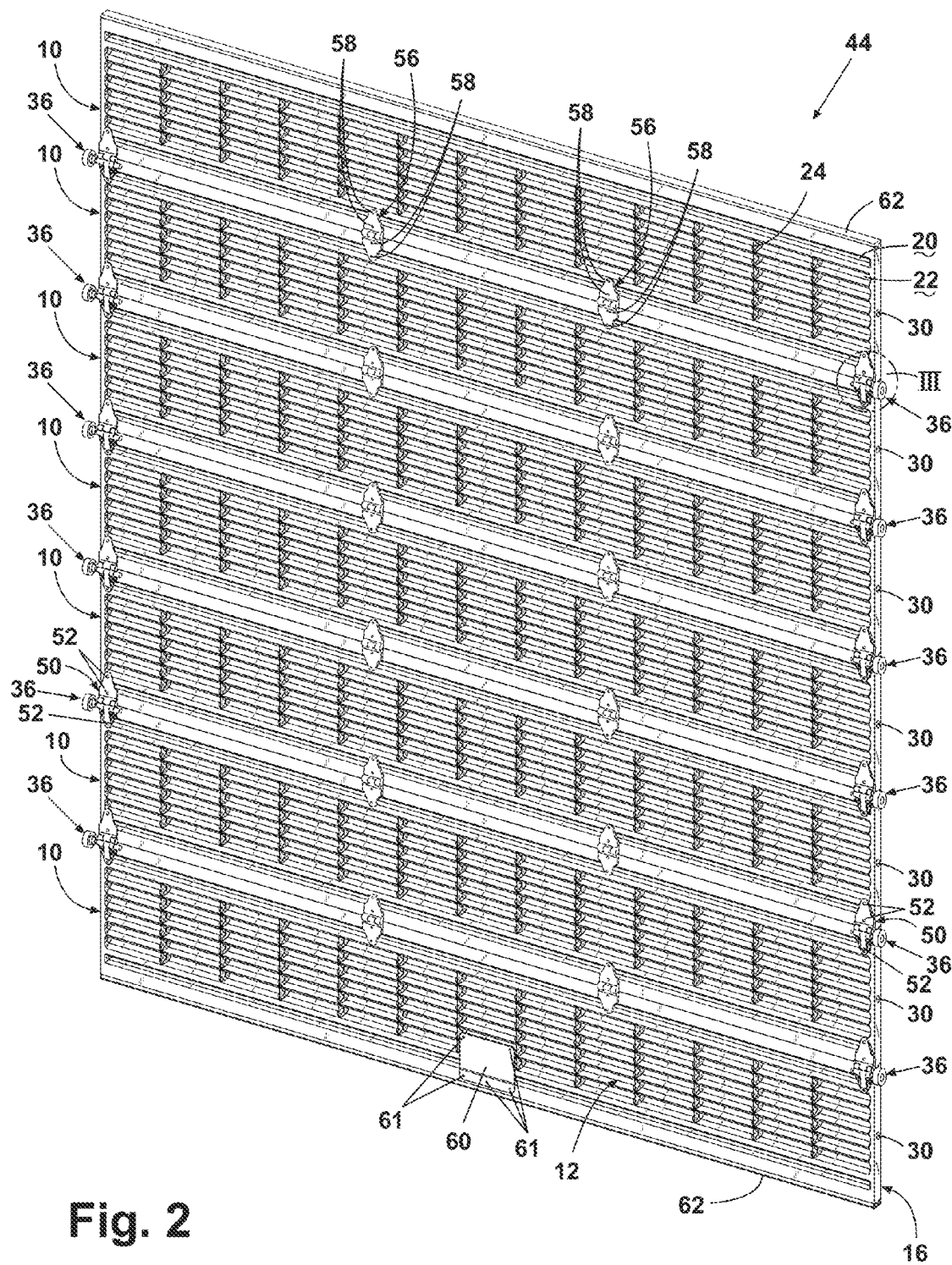
FIG. 2 is a perspective view of the inside of a roll-up door assembly illustrated in FIG. 1.
Figure 3:
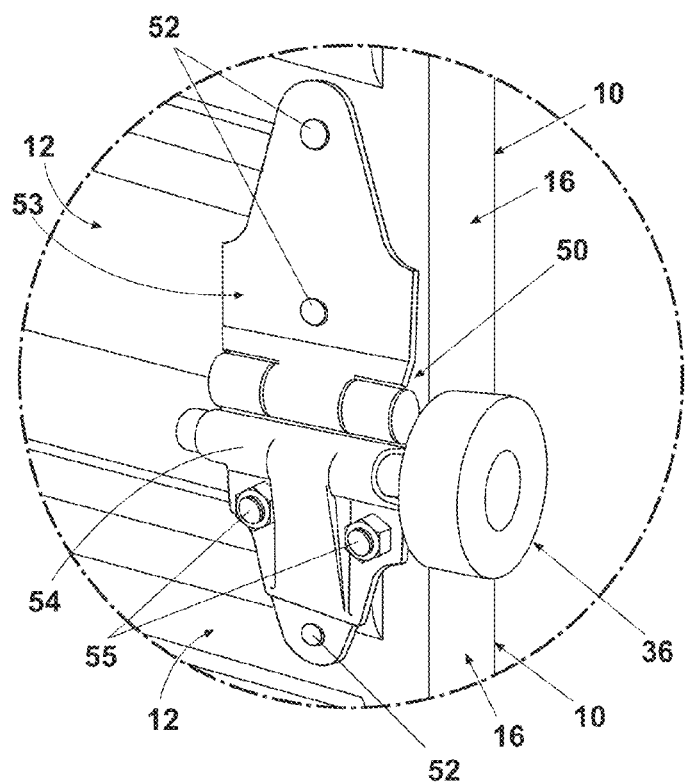
FIG. 3 is an enlarged view of the circled portion of FIG. 2 identified as III and showing an outer hinge receiving a roller assembly.
Figure 4:
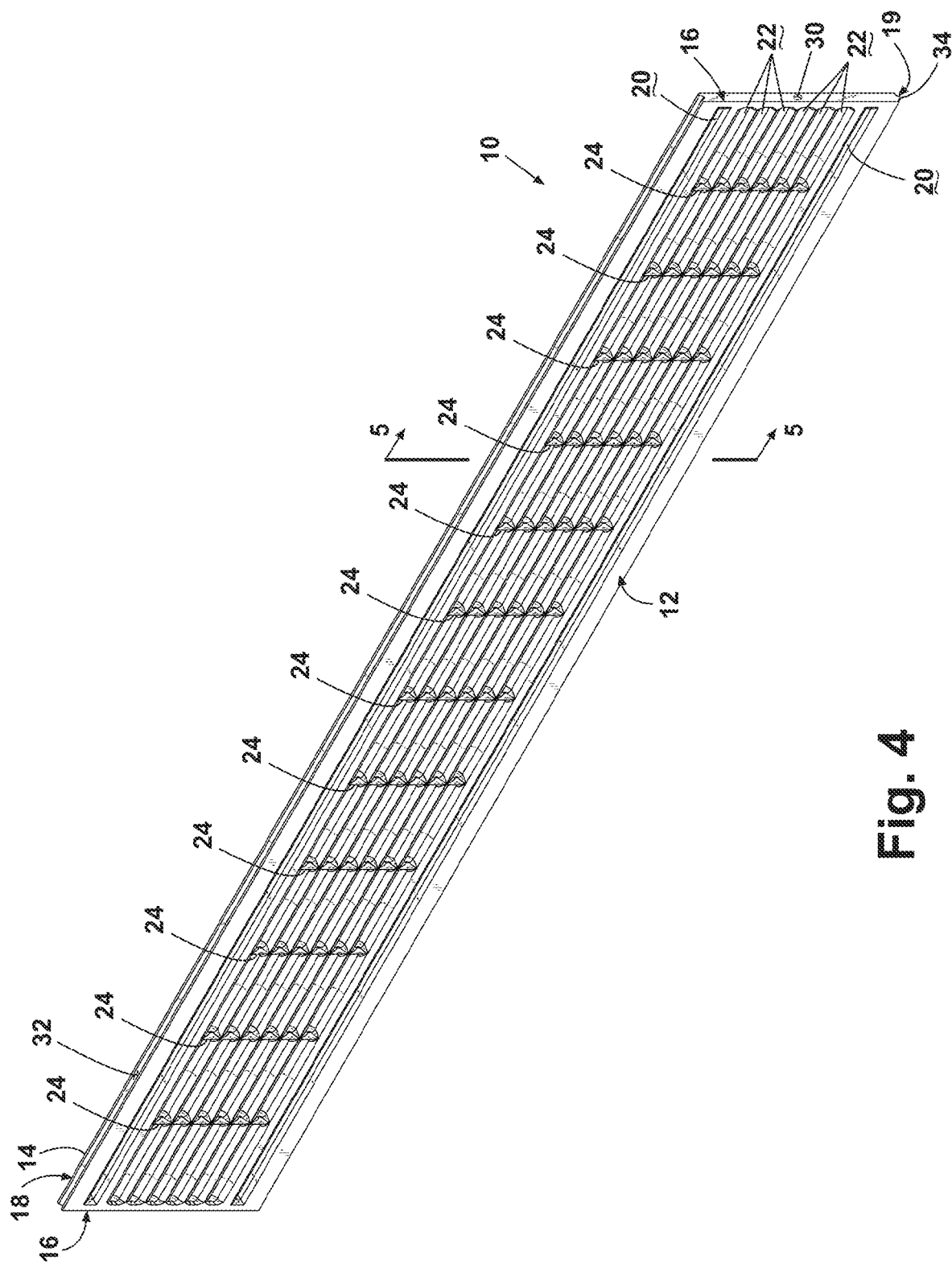
FIG. 4 is a perspective view of a panel that is used in the roll-up door assembly illustrated in FIGS. 1 and 2.

Referring now to FIGS. 2-4, a plurality of panels 10 can be assembled together to form the roll-up door 44. Each of the panels 10 comprises an inside wall 12, an outside wall 14, two end walls 16, a top wall 18, and a bottom wall 19. The inside walls 12 of the panels 10 can constitute an inside wall of the door 44. The panels 10 are interconnected at their top walls 18 and bottom walls 19 by conventional inner hinges 56 and outer hinges 50 such that the panels 10 can move at an angle to one another to effect the rolling up of the door 44. Inner hinges 56 and outer hinges 50 are attached to the panels 10 by inner rivets 58 and outer rivets 52, respectively. The inner rivets 58 and the outer rivets 52 extend through the inside wall 12 of the panel 10.

As shown in detail in FIG. 3, two conventional roller assemblies 36 are mounted to opposite sides of each of the panels 10 through the outer hinges 50. The outer hinges 50 each comprise a hinge body 53 substantially similar to a conventional hinge body. The outer hinges 50 further comprise a cap plate 54 adapted for connection to the hinge body 53 via screws 55. The cap plate 54 has a socket that receives an axle of the roller assembly 36 to mount the roller assembly to the outer hinge 50. Once mounted to the door 44, rollers of the roller assemblies 36 can be positioned within channels formed by tracks (not shown) framing the opening 122 on opposite sides thereof such that the door 44 can be rolled up and down between the closed position illustrated in FIG. 1 and an upper or open position (not shown) when the door 44 is substantially horizontal overlying the interior of the trailer 100.

The door 44 further includes a bracket 60 of the latch and handle assembly 126 attached to the lowermost panel 10 of the door 44 at the bottom wall 19 thereof by any suitable means, such as bracket rivets 61 (FIG. 2) that extend through the inside wall 12 and outside wall 14. The bracket 60 and bracket rivets 61 attach the latch and handle assembly 126 to the door 44 to facilitate movement of the door 44 between the closed position and open position when a user applies an upward or downward force to the latch and handle assembly 126. Liners 62 can also be attached to the top wall 18 and bottom wall 19 of the uppermost and lowermost panels 10, respectively, of the door 44 to produce a more airtight enclosure. The liners 62 can be sized to extend between the longitudinal edges of the inside wall 12 and outside wall 14 to entirely cover the top wall 18 of the uppermost panel 10 and the bottom wall 19 of the lowermost panel 10. It is also possible to interconnect panels 10 with other types of panels to form the door. Conventional wood panels can be used to replace damaged panels 10, if needed for an emergency, because they are interchangeable. The panels 10 can also be used with other types of panels, such as conventional wooden panels, and can be used to replace broken or damaged panels in other doors. The outside face of the outside wall 14 of the panels can be molded with a simulated wood grain to match or simulate wood door panels.

Figure 5:
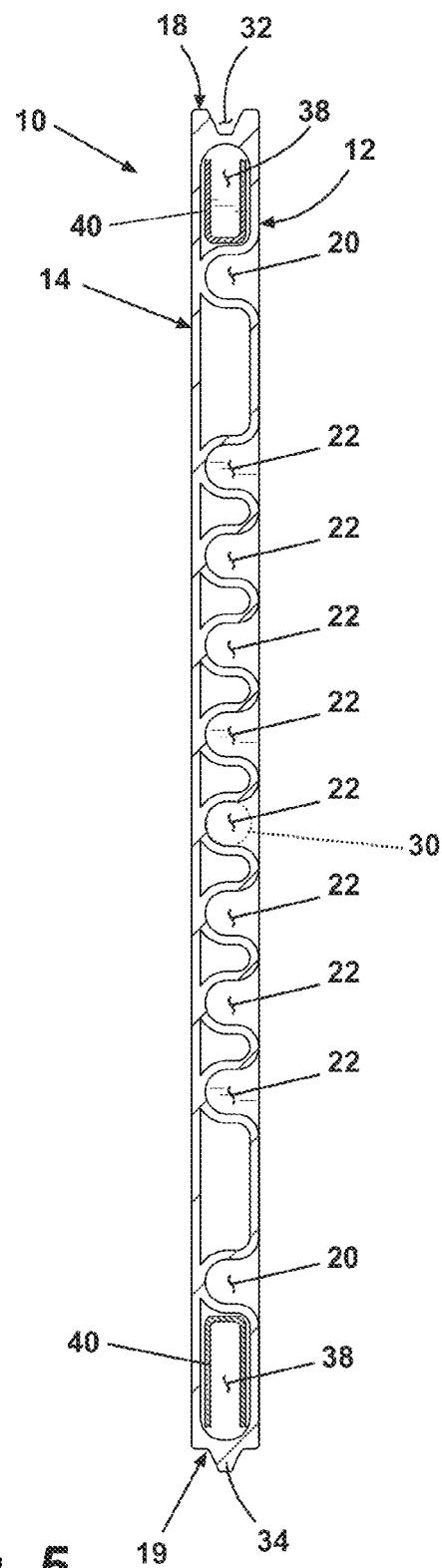
FIG. 5 is a sectional view of the panel of FIG. 3 taken along line 4-4 of FIG. 3.

Referring now also to FIG. 5, the inside wall 12 of each panel 10 includes outer channels 20, inner channels 22, and vertical ribs 24. The outside wall 14 comprises a substantially flat outer surface of the panel 10. The end walls 16 are relatively flat and one of the end walls 16 includes an opening 30 adapted to receive a nozzle (not shown), the purpose of which will be described hereinafter. The top wall 18 comprises a channel 32 spanning the length thereof and extending a distance into the panel 10. The bottom wall 19 comprises a projection 34 spanning the length thereof and adapted for receipt within the channel 32. The channel 32 and projection 34 can have any desired shape and configuration so long as the projection 34 can be removably received by the channel 32 when the panels 10 are vertically assembled into the door 44 or the like. Preferably, the projection 34 has a somewhat tapered shape to facilitate smooth pivotal movement between two adjacent panels 10, such as the shape illustrated in FIG. 5. Although the panel 10 is described as comprising inside wall 12 and outside wall 14, it is understood that when in use, the orientation of the panel 10 can be reversed.

On the inside wall 12, the outer channels 20 and inner channels 22 extend longitudinally across the panel 10 and have a length slightly less than that of the panel 10. The outer channels 20 and inner channels 22 also form ribs therebetween. Although the outer channels 20 are illustrated as having a relatively rectangular shape while the inner channels 22 are illustrated as having a relatively ovular shape, the outer channels 20 and inner channels 22 can be formed having any desired shape and can be formed in identical shapes. The outer channels 20 and inner channels 22 have a depth slightly less than that of the panel 10 such that the inside wall 12 and outside wall 14 are fused along the deepest portion of the channels 20, 22. Alternatively, the inside wall 12 and outside wall 14 can be slightly spaced along the deepest portion of the channels 20, 22. The vertical ribs 24 extend across the inner channels 22 and are oriented perpendicularly thereto. The vertical ribs 24 can be spaced equidistantly as shown, or they can be spaced in any other manner as desired. The vertical ribs 24 are approximately the depth of the panel 10 such that when viewed from either end wall 16, the vertical ribs 24 cannot be seen.

With continued reference to FIG. 5, reinforcing cavities 38 are located within the interior of the panel 10 adjacent each of the channel 32 and projection 34 at the top wall 18 and bottom wall 19, respectively. The reinforcing cavities 38 are sized to receive reinforcing members 40 therein in a secure manner, such as by a press fit or shrink fit, which will be discussed in more detail hereinafter.

The reinforcing members 40 comprise rigid bars having U-shaped cross sections that extend longitudinally along the length of the panel 10 between the end walls 16. The reinforcing members 40 can be completely enclosed by the panel 10. The reinforcing bars can be made of relatively strong metal, such as steel, or of aluminum but can also be made of a suitable rigid or reinforced plastic material. An exemplary material that can be used to form the reinforcing members is a Martinsite, high-strength, high-carbon steel. The bars are stiffer than the thermoplastic material from which the panels 10 are molded. The reinforcing members 40 can have any shape that, when inserted into the panel 10, provides reinforcement to the panel 10. For example, the reinforcing members 40 can be solid aluminum rods having a circular cross section, or hollow iron bars having a square cross section. The cavities 38 are sized such that they will shrink around the reinforcing members 40 during formation of the panel 10 as the panel 10 cools to frictionally secure the reinforcing members 40 within the cavities 38.

Figure 6:
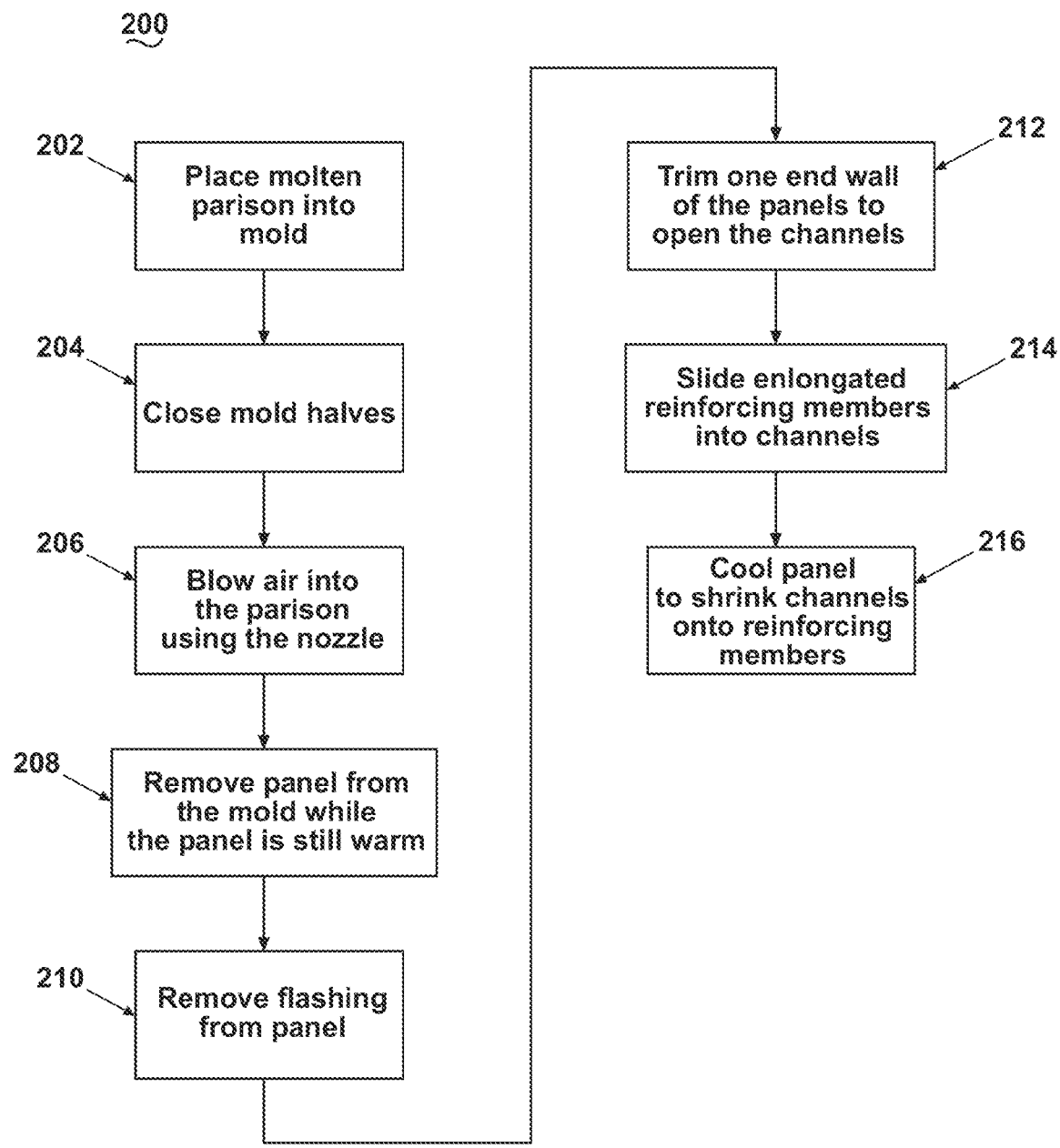
FIG. 6 is a schematic diagram of a method of making a roll up door panel according to the invention.

Referring now to FIG. 6, each panel 10 is formed by blow molding a hollow panel in a mold. The mold is formed having a predominantly rectangular exterior shape and comprises two mold halves. The interiors of the mold halves are formed having the shape of the inside wall 12 and outside wall 14 of the panel 10, respectively. A method 200 of blow molding a panel 10 comprises a first step 202 in which a molten preform or parison is placed into the mold. Next, the mold halves are closed at step 204. Air is then blown into the parison or preform by the nozzle at step 206 through the opening 30 to expand the parison to fill the mold cavity to form an article in the shape of the mold with flashing, or excess material, around the outside of the article. The channels 20, 22 and vertical ribs 24 in the outside wall 12 of the panel 10 are formed in the panels 10 at step 206. Preferably, the channels 20, 22 extend inwardly toward the inside wall 14 of the panel 10 and are fused thereto through heat and pressure. Before the panel 10 is cooled and while the panel 10 is still warm, the panel 10 is removed from the mold at step 208. At step 210, the flashing is removed from the outside of the panel 10, and then at step 212, one end wall 16 is trimmed to provide openings to the channels 38. Next, at step 214, while the panel 10 is still warm, the elongated U-shaped reinforcing members 40 are slid inside the channels 38. The panel 10 is then cooled completely at final step 216. As the panel 10 cools, the panel 10 shrinks around the elongated U-shaped reinforcing members 40 to lock the elongated U-shaped reinforcing members 40 into the panels 10.

Once the panels 10 have been formed, the door 44 can be assembled by interconnecting the panels 10 using the hinges 50, 56 and rivets 52, 58, respectively. The bracket 60 of the latch assembly 126 can also be connected to the lowermost panel 10 at the bottom wall 19 thereof by the bracket rivets 61, and the liners 62 can be connected to the top wall 18 of the uppermost panel 10 and the bottom wall 19 of the lowermost panel 10. The axles of the roller assemblies 36 can be inserted into the sockets formed by the cap plate 54 and hinge body 53 of each of the outer hinges 52. The rollers of the roller assemblies 36 can then be positioned within the channel of the tracks to mount the door 44 to the trailer 100.

The invention remedies the problem of replicating a wooden roll-up door panel by providing a blow-molded a panel 10 with multiple cavities formed by a simple and efficient method 200. In addition, the reinforcing members 40 serve to prevent any warping of the panels 10 and help to strengthen the panels 10. The reinforced panels 10 can be used to form durable and long-lasting roll-up doors 44. In addition, the panels 10 according to the invention are sized to be interchangeable with conventional wooden panels so that the panels 10 according to the invention can replace a worn or damaged wooden panel and vice versa. The panels 10 can have a textured surface resembling a wooden surface. The textured surface can be formed during the molding process so that the panels 10 look the same as wooden panels and thus can be used in a roll up door assembly that includes one or more wooden panels. As wooden panels are currently used in a large number of roll-up doors and are widely available, the interchangeability provided by the inventive panels 10 conveniently allows damaged blow molded panels 10 to be replaced by wooden panels if replacement blow molded panels 10 are not available.

The panels can be made from a variety of suitable moldable outdoor thermoplastic materials including polyolefin polymers (polyethylene, polypropylene) and copolymers and polyvinyl chloride polymers and copolymers. The preferred material is a high density polyethylene with an extra high molecular weight, hexane copolymer sold, for example by Chevron Phillips Chemical Company as MARLEX® HMX 50100, and having a tensile strength at yield of 3,600 psi (25 MPa), Elongation at break of 700%, Flexural modulus of 175,000 psi (1200 MPa), ECSR (condition A and B)>600 h, durometer hardness Type D 69, Vicat Softening Temperature 258° F. (126° C.), heat deflection temperature 173° F. (78° C.), Brittleness Temperature <−103° F. (<−75° C.) and tensile impact 90 ft-lb/in$^2$ (190 kJ/m$^2$).

Although the present invention has been described in terms of specific exemplary embodiments, it will be appreciated that reasonable variations and modifications are possible within the scope of the foregoing disclosure and drawings without departing from the spirit of the invention which is set forth in the following claims.

What is claimed is:

1. A roll-up door configured to be mounted in an opening to an interior of a truck or trailer and comprising a plurality of panels joined together at the upper and lower portions thereof with hinges and further comprising roller assemblies mounted to sides of the panels for mounting the panels in channels for movement between an upper position and a lower position, the improvement comprising at least some of the panels are formed of thermoplastic material that is blow-molded into hollow panels that have a relatively flat outside wall and an inside wall, wherein the inside wall is characterized by ribs that extend longitudinally and transversely on each thermoplastic blow-molded panel, wherein at least some of the ribs that extend longitudinally are formed solely by contiguous, open, longitudinally-extending channels that extend toward the outside wall and at least some of the longitudinally-extending channels are fused to the outside wall of the thermoplastic blow-molded panels and the hinges are mounted to the thermoplastic blow-molded panels with fasteners that penetrate the thermoplastic blow-molded panels at the upper and lower portions thereof.

2. A roll-up door according to claim 1, wherein the thermoplastic blow-molded panels have elongated hollow channels that extend along the at least one of the upper and lower portions of each panel and reinforcing members of a material stiffer than the thermoplastic material are positioned in the elongated hollow channels.

3. A roll-up door according to claim 2, wherein the elongated hollow channels are shrunk fit onto the reinforcing members to frictionally retain the reinforcing members in the hollow channels.

4. A roll-up door according to claim 2, wherein the reinforcing members are press fit into the elongated hollow channels to frictionally retain the reinforcing members in the hollow channels.

5. A roll-up door according to claim 2 wherein the elongated hollow channels are formed along both the upper and lower portions of each thermoplastic blow-molded panel, and wherein both of the elongated hollow channels have reinforcing members therein.

6. A roll-up door according to claim 2 wherein the reinforcing members are formed of a relatively stiff metal.

7. A roll-up door according to claim 6 where in the relatively stiff metal is selected from steel and aluminum.

8. A roll-up door according to claim 2 wherein the reinforcing members are formed of a rigid plastic.

9. A roll-up door according to claim 2 wherein the reinforcing members are frictionally retained in the elongated hollow channels.

10. A roll-up door according to claim 1 wherein at least some of the hinges are positioned at the sides of the panels and these hinges have sockets and the roller assemblies are mounted in the sockets.

11. A roll-up door according to claim 1 wherein the thermoplastic blow-molded panels have elongated hollow channels that extend along the upper and lower portions of each panel and reinforcing members of a material stiffer than the thermoplastic material are positioned in the elongated channels and are frictionally retained therein.

12. A roll-up door according to claim 1 wherein the fasteners are rivets.

13. A panel for use in a roll-up door assembly comprising a plurality of panels directly joined together at top and bottom portions thereof with hinges and roller assemblies mounted to the panels for mounting the panels in channels for movement between an upper position and a lower position, wherein the panel is formed of thermoplastic material that is blow-molded into a hollow form that has a relatively flat outside wall and an inside wall, wherein the inside wall is characterized by ribs that extend longitudinally and transversely on the panel; elongated hollow channels extend along the top and bottom portions of the panel; and reinforcing members of a material stiffer than the thermoplastic material are frictionally retained in the elongated hollow channels wherein at least some of the ribs that extend longitudinally are formed solely by contiguous, open, longitudinally-extending channels that extend toward the outside wall and at least some of the longitudinally-extending channels are fused to the outside wall.

14. A panel according to claim 13, wherein the elongated hollow channels are shrunk fit onto the reinforcing members to frictionally retain the reinforcing members in the hollow channels.

15. A panel according to claim 13, wherein the reinforcing members are press fit into the elongated hollow channels to frictionally retain the reinforcing members in the hollow channels.

16. A panel according to claim 13 wherein the elongated hollow channels are formed along both the top and bottom walls of the panel, and wherein both of the elongated hollow channels have reinforcing members frictionally retained therein.

17. A panel according to claim 13 wherein the reinforcing members are formed of a relatively stiff metal.

18. A panel according to claim 17 where in the relatively stiff metal is selected from steel and aluminum.

19. A panel according to claim 13 wherein the reinforcing members are formed of a rigid plastic.

\* \* \* \* \*